United States Patent
Jin

(10) Patent No.: US 8,630,267 B1
(45) Date of Patent: Jan. 14, 2014

(54) INTERFERENCE SUPPRESSION IN WIRELESS BACKHAUL NETWORK USING COLLABORATIVE WEIGHT UPDATE SCHEME

(75) Inventor: Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 617 days.

(21) Appl. No.: 12/624,501

(22) Filed: Nov. 24, 2009

(51) Int. Cl.
*H04W 4/00* (2009.01)

(52) U.S. Cl.
USPC .............................. 370/332; 370/252; 370/329

(58) Field of Classification Search
USPC .......................................... 370/252, 329, 332
See application file for complete search history.

(56) References Cited

U.S. PATENT DOCUMENTS

| | | | |
|---|---|---|---|
| 5,917,446 A | 6/1999 | Greenspan | |
| 2004/0095907 A1* | 5/2004 | Agee et al. | 370/334 |
| 2006/0292990 A1 | 12/2006 | Karabinis et al. | |
| 2008/0051145 A1* | 2/2008 | Jin | 455/561 |
| 2008/0090575 A1* | 4/2008 | Barak et al. | 455/444 |
| 2008/0158057 A1* | 7/2008 | Jin | 342/377 |
| 2011/0076954 A1* | 3/2011 | Wee et al. | 455/63.1 |
| 2011/0103295 A1* | 5/2011 | Khandekar et al. | 370/315 |

\* cited by examiner

*Primary Examiner* — Jason Mattis
(74) *Attorney, Agent, or Firm* — Edell, Shapiro & Finnan, LLC

(57) ABSTRACT

Coordinated transmission of sounding messages between base stations and feeder stations in a wireless backhaul network is provided to facilitate accurate observations by each base station of signals from its serving feeder station and from other feeder stations in order to generate interference nulling beamforming weights for transmission to and/or reception from its serving feeder station. Likewise, these techniques facilitate accurate observations by each feeder station of signals from the base station(s) it serves and from other base stations in order to generate interfering nulling beamforming weights for transmission to and/or reception from the base station(s) it serves.

24 Claims, 11 Drawing Sheets

INTERFERENCE SUPPRESSION IN WIRELESS BACKHAUL NETWORK USING COLLABORATIVE WEIGHT UPDATE SCHEME

TECHNICAL FIELD

The present disclosure relates to wireless communication devices and systems and more particularly to suppressing interference among feeder stations and base stations operating in a wireless backhaul network.

BACKGROUND

In wireless communication networks, a common architecture is to provide a wireless base station device that serves as a gateway for wireless communications with each of multiple wireless client devices, also called client devices or mobile stations. The base station devices in turn need to be connected to a wired network, e.g., the Internet. This infrastructure that connects the base stations to the wired network is referred to as a backhaul network.

The backhaul network, it turns out, is a relatively expensive component in a wireless network deployment. Moreover, deploying the backhaul network may be difficult in certain base station deployments, such as those that involve installing base stations in places such as light poles, building walls, under the eaves of buildings, etc.

To address the difficult in deploying a backhaul network, a so-called "self-backhaul" base station was developed in which a wireless link is provided between the base stations and feeder devices. Thus, a wireless backhaul network is formed that overlays the primary wireless network over which the base station serves client devices. The wireless backhaul network carries all the backhaul traffics between the base stations and the feeders. Thus, the feeders act like base stations in the backhaul network with respect to the base stations in the primary wireless network.

The wireless backhaul network is a fixed point-to-point or point-to-multipoint wireless network with several attributes. The "clients" in the wireless backhaul network are base stations whose position and orientation is optimal for the primary wireless network (e.g., in a micro or pico network) but not necessarily for the wireless backhaul network. The base stations are sometimes positioned at relatively high attitudes with a line-of-sight (LOS) or near-LOS wireless link to the feeders. Consequently, the path loss between the base stations and the feeders nearly follow a free space model, and as a result, the interference among feeders and base stations is very high, which in turn reduces the carrier-to-interference-plus-noise ratio (CINR) to nearly to 0 dB in the wireless backhaul network.

DESCRIPTION OF EXAMPLE EMBODIMENTS

Overview

Techniques are provided herein to coordinate transmission of sounding messages between base stations and feeder stations in a wireless backhaul network in order to facilitate accurate observations by each base station of signals from its serving feeder station and from other feeder stations in order to generate interference nulling beamforming weights for transmission to and/or reception from its serving feeder station. Likewise, these techniques facilitate accurate observations by each feeder station of signals from the base station(s) it serves and from other base stations in order to generate interfering nulling beamforming weights for transmission to and/or reception from the base station(s) it serves.

Example Embodiments

Figure 1:
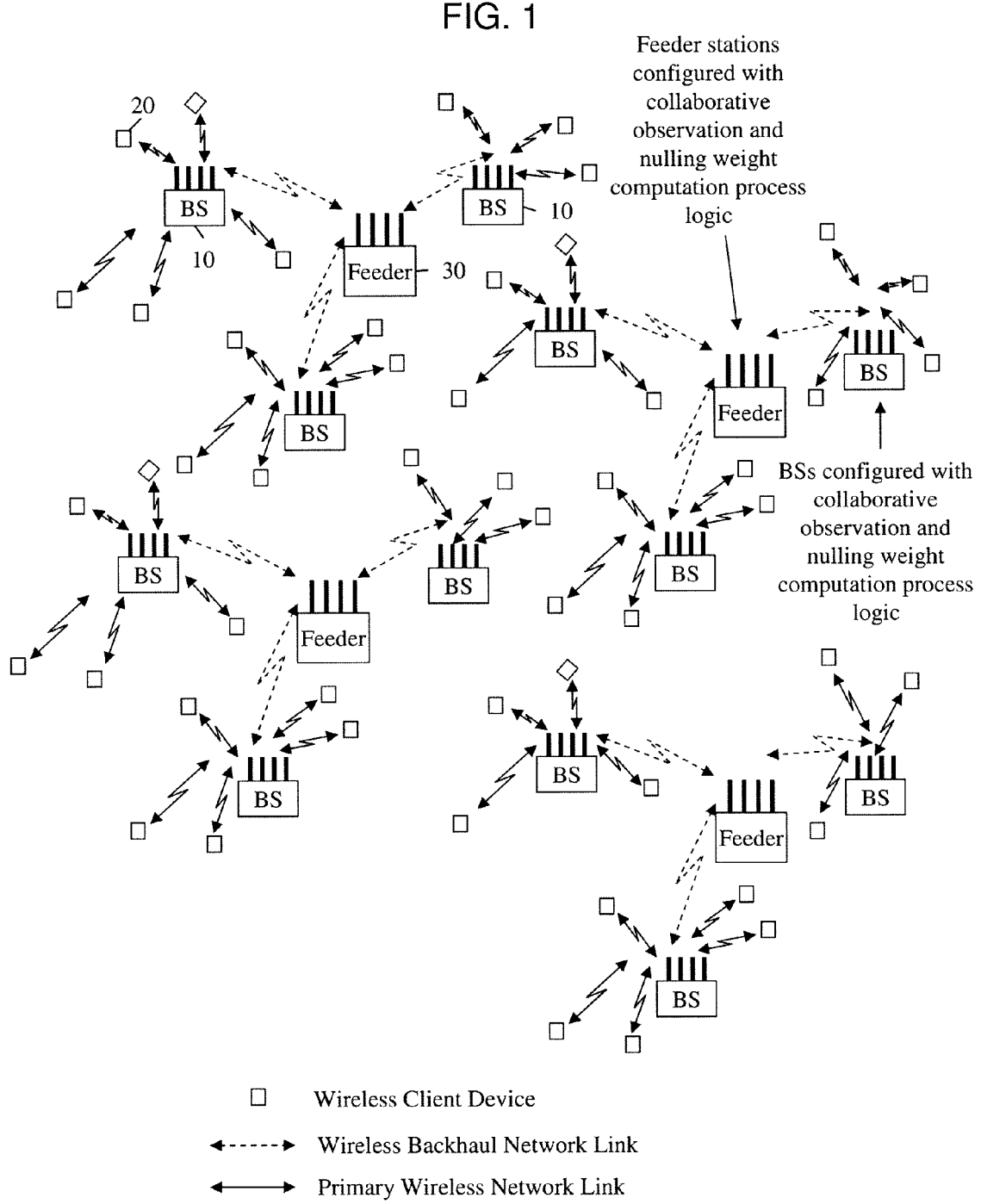
FIG. 1 is a block diagram showing a backhaul network used for base transceiver stations operating in a wireless network.

Referring first to FIG. 1, a wireless communication network environment is shown comprising a primary wireless network involving wireless communication between wireless base stations (BSs) 10 and wireless client devices 20 and a wireless backhaul network involving wireless communication between BS devices 20 and feeder stations 30 (simply referred to herein as feeders). The BSs 10 may be long-range BSs that can serve wireless client devices over a relatively large area, or they may be so-called "micro" BSs or "pico" BSs that are designed to serve a relatively smaller area and a lesser number of wireless client devices.

BSs 10 may be arranged in clusters. The size of a cluster depends mainly on throughput requirements. For each BS cluster, an appropriate location of a feeder station is determined. Feeder stations 30 may be positioned on towers, on top of buildings, on utility poles, on the sides of buildings, etc. Feeder stations 30 may even be co-located with BSs 10.

The BSs 10 may be configured to wirelessly communicate with the wireless client devices 20 according to any of a variety of wireless communication standards, examples of which are the IEEE 802.16 standard known commercially as WiMAX™ and the IEEE 802.11 standard known commercially as WiFi™.

When planning a wireless network deployment, BSs 10 may use the same antennas for both backhaul network communications and communications in the underlying wireless network with wireless client devices 20 when the same frequency band is used for communications in both networks. Time division duplex (TDD) communication techniques may be employed in the backhaul network for communications between the BSs 10 and the feeder stations 30.

One challenge for backhaul network design is to minimize co-channel interference among BSs 10 and the feeder stations 30. To suppress interferences, both the BSs 10 and feeder stations 30 have a plurality of antennas.

To maximize the efficiency on the shared channel, the BSs 10 and feeder stations 30 employ nulling beamforming in both directions. That is, each BS performs nulling beamforming with respect to uplink backhaul traffic signals sent to its selected feeder station and also performs nulling beamforming with respect to downlink backhaul traffic signals received from its selected feeder station. Likewise, each feeder station performs nulling beamforming with respect to uplink backhaul traffic signals it receives from a base station that selects it and also performs nulling beamforming with respect to downlink backhaul traffic signals it transmits to a base station that has selected it.

To enable nulling beamforming using their respective antenna arrays, BSs and feeder stations need to know the spatial signatures of co-channel BSs and feeders. The nulling efficiency is determined by the accuracy of the spatial signatures of both the desired signals and the interfering signals.

Accordingly, techniques are provided herein to enable BSs 10 and feeder stations 30 to collaboratively observe spatial signatures of desired signals and spatial signatures of interfering signals in order to compute nulling beamforming weights. The BSs 10 and feeder stations 30 are configured with collaborative observation and nulling weight computation process logic. As explained further hereinafter, the BS collaborative observation and nulling weight computation process logic is different from the feeder station collaborative observation and nulling weight computation process logic.

Figure 2:
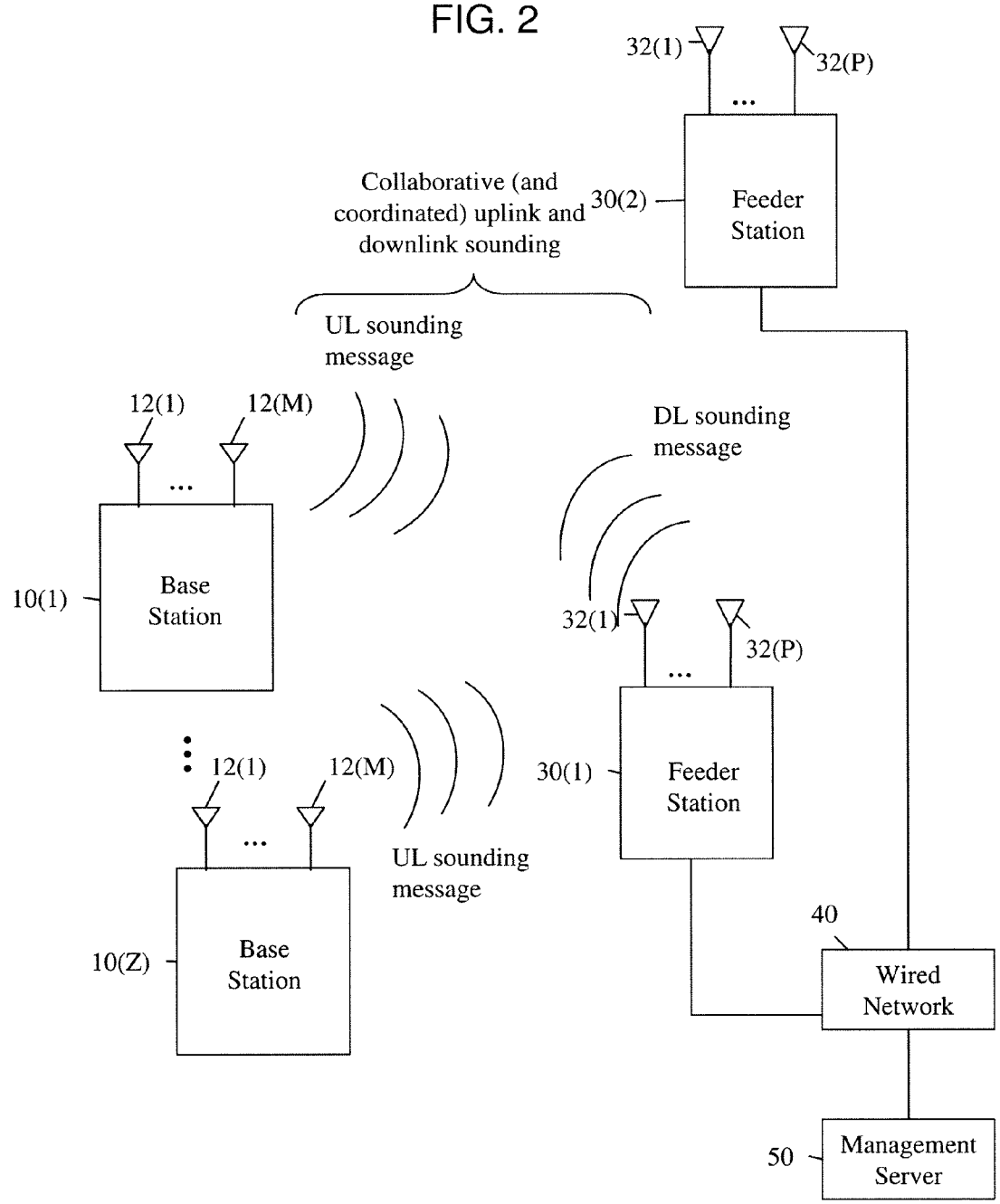
FIG. 2 is a block diagram showing the backhaul network in more detail generally depicting a collaborative spatial signature observation scheme.

Turning to FIG. 2, a more detailed view is shown of a portion of the network arrangement shown in FIG. 1. In FIG. 2, a plurality of BSs 10(1)-10(Z) are shown and two feeder stations 30(1) and 30(2) are shown. For simplicity, no wireless client devices are shown in FIG. 2. The feeder stations 30(1) and 30(2) are connected to a wired network 40. The wired network 40 may be a local area network or a wide area network (e.g., the Internet). Each BS 10(1)-10(Z) comprises a plurality of antennas 12(1)-12(M), though it should be understood that each BS need not have the same number of antennas. Each feeder station 30(1) and 30(2) has a plurality of antennas 32(1)-32(P), but again each feeder station need not have the same number of antennas. The feeder stations receive uplink (UL) backhaul network traffic from BSs and forward that traffic over the wired network 40 for appropriating routing. Likewise, the feeder stations receives traffic intended for wireless client devices from the wired network 40 and transmits it as downlink (DL) backhaul network traffic to the appropriate BSs.

A management server 50 is provided to coordinate information between feeder stations as described further hereinafter. The management server 50 may communicate with feeder stations via the wired network 40.

FIG. 2 indicates that the BSs and feeder stations perform collaborative (and coordinated) uplink and downlink sounding. Each BS is configured to transmit UL sounding messages and each feeder station is configured to transmit DL sounding messages. The timing of transmissions of UL sounding messages from BSs and of DL sounding messages from feeder stations is configured in such a manner to avoid interference among BSs, between BSs and feeder stations, and among feeder stations.

Figure 3:
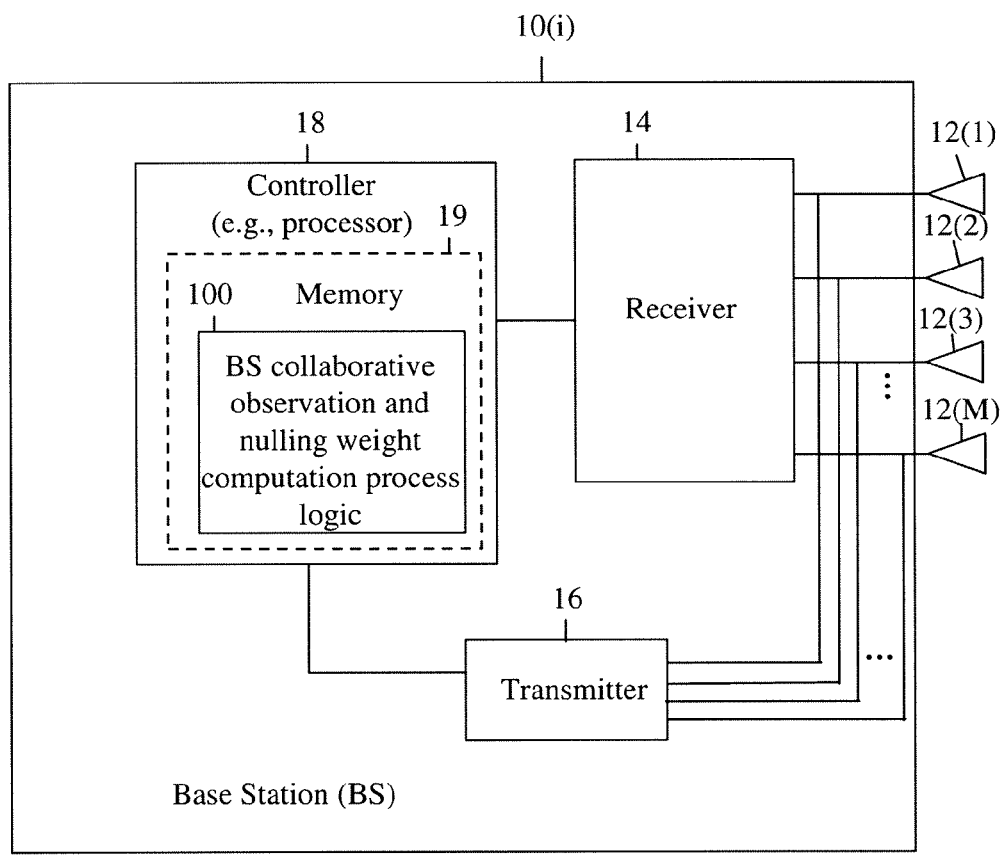
FIG. 3 is a block diagram of a feeder station configured to execute a feeder collaborative observation and nulling weight computation process.

Reference is now made to FIG. 3 for a description of BS 10(i) that is configured or equipped to perform the collaborative UL and DL sounding techniques. The block diagram of the BS 10(i) is meant to be representative of a block diagram for any of the BSs shown in FIGS. 1 and 2 that is configured to participate in the collaborative UL and DL sounding techniques. The BS 10(i) comprises a receiver 14, a transmitter 16 and a controller 18. The controller 18 supplies data (in the form of transmit signals) to the transmitter 16 to be transmitted and processes signals received by the receiver 14. In addition, the controller 18 performs other transmit and receive control functionality. Parts of the functions of the receiver 14, transmitter 16 and controller 18 may be implemented in a modem and other parts of the receiver 14 and transmitter 16 may be implemented in radio transmitter and radio transceiver circuits. It should be understood that there are analog-to-digital converters (ADCs) and digital-to-analog converters (DACs) in the various signal paths to convert between analog and digital signals.

The receiver 14 receives the signals detected by each of the antennas 12(1)-12(M) and supplies corresponding antenna-specific receive signals to the controller 18. It is understood that the receiver 14 may comprise a plurality of individual receiver circuits, each for a corresponding one of a plurality of antennas 12(1)-12(M) and which outputs a receive signal associated with a signal detected by a respective one of the plurality of antennas 12(1)-12(M). For simplicity, these individual receiver circuits are not shown. The transmitter 16 may comprise individual transmitter circuits that supply respective upconverted signals to corresponding ones of a plurality of antennas 12(1)-12(M) for transmission. For simplicity, these individual transmitter circuits are not shown.

The BS 10(i) may use beamforming, multiple-input multiple-output (MIMO), or a combination of beamforming and MIMO techniques to transmit signals to client devices 20. The BS 10(i) also performs transmit beamforming (and nulling) techniques when transmitting UL backhaul network traffic to a feeder station and receive beamforming (and nulling) techniques when receiving DL backhaul network traffic from a feeder station. Using the techniques described herein, the controller 18 generates transmit beamforming and nulling weights to be applied to UL backhaul network traffic signals that the BS 10(i) sends to a feeder station, and generates receive beamforming and nulling weights to be applied to DL backhaul network traffic signals that the BS 10(i) receives from a feeder station.

The controller 18 is, for example, a signal or data processor that comprises a memory 19 or other data storage block that stores data used for the techniques described herein. The memory 19 may be separate or part of the controller 18. Instructions for BS collaborative observation and nulling weight computation process logic 100 are stored in the memory 19 for execution by the controller 18. The process logic 100 is described in detail hereinafter in connection with FIGS. 10, 12 and 15.

The functions of the controller 18 may be implemented by logic encoded in one or more tangible media (e.g., embedded logic such as an application specific integrated circuit, digital signal processor instructions, software that is executed by a processor, etc.), wherein the memory 19 stores data used for the computations described herein and stores software or processor instructions that are executed to carry out the computations described herein. Thus, the process logic 100 may take any of a variety of forms, so as to be encoded in one or more tangible media for execution, such as with fixed logic or programmable logic (e.g., software/computer instructions executed by a processor) and the controller 18 may be a programmable processor, programmable digital logic (e.g., field programmable gate array) or an application specific integrated circuit (ASIC) that comprises fixed digital logic, or a combination thereof. For example, the controller 18 may be a modem in the base station and thus be embodied by digital logic gates in a fixed or programmable digital logic integrated circuit, which digital logic gates are configured to perform the process logic 100. In another form, the process logic 100 may be embodied in a processor readable medium that is encoded with instructions for execution by a processor (e.g., controller 18) that, when executed by the processor, are operable to cause the processor to perform the functions described herein in connection with process logic 100.

Figure 4:
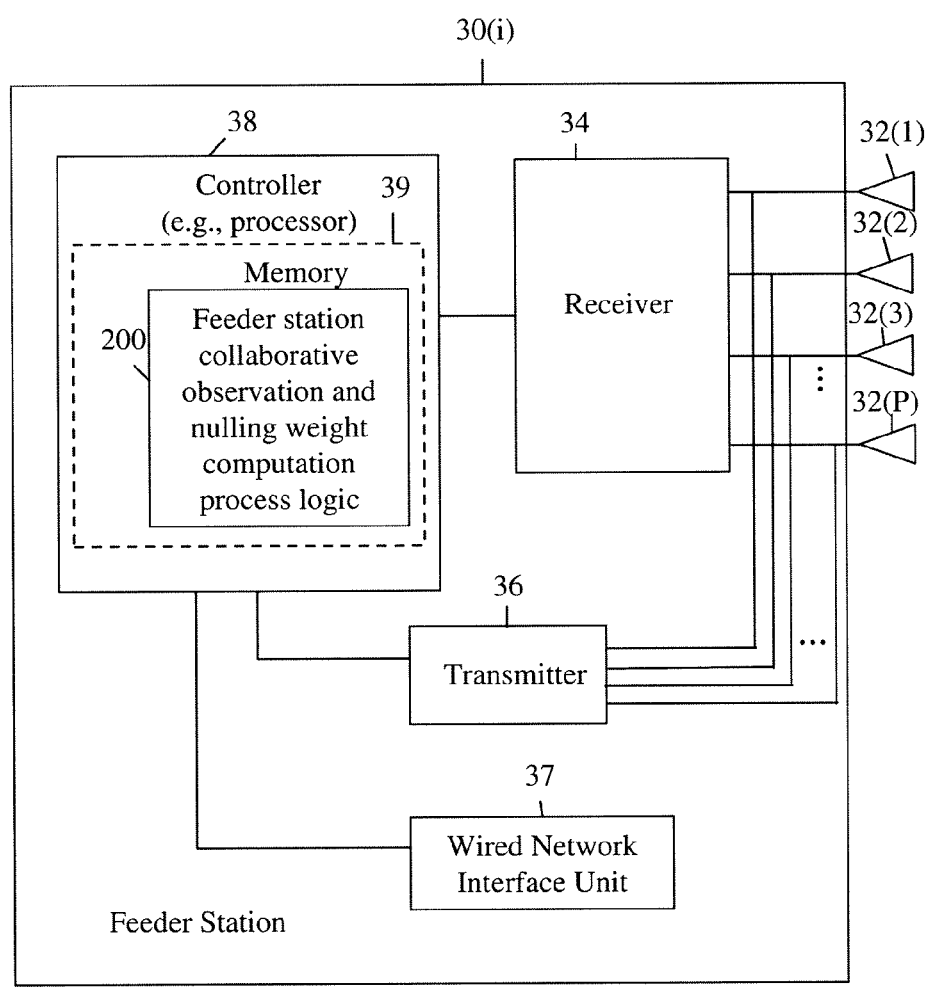
FIG. 4 is a block diagram of a base transceiver station device configured to execute a BTS collaborative observation and nulling weight computation process.

Similarly, with reference to FIG. 4, a block diagram of a feeder station 30(i) as shown. Like FIG. 3, the block diagram shown in FIG. 4 is meant to be representative of any feeder station shown in FIGS. 1 and 2 that is configured to participate in the collaborative UL and DL sounding techniques.

The feeder station 30(i) comprises a receiver 34, a transmitter 36 and a controller 38. The controller 38 supplies data (in the form of transmit signals) to the transmitter 16 to be transmitted and processes signals received by the receiver 34. In addition, the controller 38 performs other transmit and receive control functionality. Parts of the functions of the receiver 34, transmitter 36 and controller 38 may be implemented in a modem and other parts of the receiver 34 and transmitter 36 may be implemented in radio transmitter and radio transceiver circuits. It should be understood that there are analog-to-digital converters (ADCs) and digital-to-analog converters (DACs) in the various signal paths to convert between analog and digital signals.

The receiver 34 receives the signals detected by each of the antennas 32(1)-32(P) and supplies corresponding antenna-specific receive signals to the controller 18. It is understood that the receiver 14 may comprise a plurality of individual receiver circuits, each for a corresponding one of a plurality of antennas 32(1)-32(P) and which outputs a receive signal associated with a signal detected by a respective one of the plurality of antennas 32(1)-32(P). For simplicity, these individual receiver circuits are not shown. The transmitter 16 may comprise individual transmitter circuits that supply respective upconverted signals to corresponding ones of a plurality of antennas 32(1)-32(P) for transmission. For simplicity, these individual transmitter circuits are not shown. The controller 38 applies downlink beamforming weight vectors to the multiple downlink transmission streams (e.g., symbol streams) to produce transmit signals. The controller 18 supplies the transmit signals to the transmitter 16 and the transmitter radio frequency (RF) modulates (e.g., upconverts) the respective transmit signals for transmission via respective ones of the plurality of antennas.

The controller 38 is, for example, a signal or data processor that comprises a memory 39 or other data storage block that stores data used for the techniques described herein. The memory 19 may be separate or part of the controller 38. Instructions for feeder station collaborative observation and nulling weight computation process logic 200 are stored in the memory 39 for execution by the controller 38. The process logic 200 is described in detail hereinafter in connection with FIGS. 11, 13 and 14.

The feeder station 30(i) also comprises a wired network interface unit (e.g., Ethernet interface card) 37 that enables the feeder station 30(i) to send and transmit packets via the wired network 40 (FIG. 2).

The feeder station 30(i) performs transmit beamforming (and nulling) techniques when transmitting DL backhaul network traffic to a BS and receive beamforming (and nulling) techniques when receiving UL backhaul network traffic from a BS. Using the techniques described herein, the controller 38 generates transmit beamforming and nulling weights to be applied to DL backhaul network traffic signals that the feeder station 30(i) sends to a BS, and generates receive beamforming and nulling weights to be applied to UL backhaul network traffic signals that the feeder station 30(i) receives from a BS.

The functions of the controller 38 may be implemented by logic encoded in one or more tangible media (e.g., embedded logic such as an application specific integrated circuit, digital signal processor instructions, software that is executed by a processor, etc.), wherein the memory 39 stores data used for the computations described herein and stores software or processor instructions that are executed to carry out the computations described herein. Thus, the process logic 300 may take any of a variety of forms, so as to be encoded in one or more tangible media for execution, such as with fixed logic or programmable logic (e.g., software/computer instructions executed by a processor) and the controller 38 may be a programmable processor, programmable digital logic (e.g., field programmable gate array) or an ASIC that comprises fixed digital logic, or a combination thereof. For example, the controller 38 may be a modem in the feeder station and thus be embodied by digital logic gates in a fixed or programmable digital logic integrated circuit, which digital logic gates are configured to perform the process logic 200. In another form, the process logic 200 may be embodied in a processor readable medium that is encoded with instructions for execution by a processor (e.g., controller 38) that, when executed by the processor, are operable to cause the processor to perform the functions described herein in connection with process logic 200.

As will become more apparent hereinafter, a base station apparatus is provided comprising a plurality of antennas; a receiver configured to generate a plurality of receive signals based on reception at respective ones of the plurality of antenna of downlink sounding messages in corresponding downlink sounding frames transmitted by respective ones of a plurality of feeder stations operating in a wireless backhaul network; a transmitter configured to generate transmit signals to be transmitted by respective ones of the plurality of antennas; and a controller configured to connect to the transmitter and the receiver. The controller is configured to generate uplink sounding messages for transmission by the transmitter in a particular one of a plurality of uplink sounding frames allocated for uplink sounding, generate spatial signature information with respect to a serving feeder station based on downlink sounding messages received from the serving feeder station in downlink sounding frames designated for the serving feeder station, generate interference spatial signature information based on signals received during downlink sounding frames other than the downlink sounding frames designated for the serving feeder station, and based on the spatial signature information for the serving feeder station and the interference spatial signature information, generate interference nulling beamforming weights for use when transmitting uplink backhaul traffic signals to the serving feeder station and/or for use when receiving downlink backhaul traffic signals from the serving feeder station.

Moreover, a processor readable medium is provided that is encoded with or stores instructions, that when executed by a processor, cause the processor to: generate uplink sounding messages in a particular one of a plurality of uplink sounding frames allocated for uplink sounding to feeder stations in a wireless backhaul network; generate spatial signature information with respect to a serving feeder station based on downlink sounding messages received from the serving feeder station in downlink sounding frames designated for the serving feeder station; generate interference spatial signature information based on signals received during downlink sounding frames other than the downlink sounding frames designated for the serving feeder station; and based on the spatial signature information for the serving feeder station and the interference spatial signature information, generate interference nulling beamforming weights for use when transmitting uplink backhaul traffic signals to the serving feeder station and/or for use when receiving downlink backhaul traffic signals from the serving feeder station.

Similarly, an feeder station apparatus comprising a plurality of antennas; a receiver configured to generate a plurality of receive signals based on reception at respective ones of the plurality of antennas of uplink sounding messages in corresponding uplink sounding frames allocated for base stations to transmit uplink sounding messages; a transmitter configured to generate transmit signals to be transmitted by respective ones of the plurality of antennas, including downlink sounding messages; and a controller configured to connect to the receiver and the transmitter. The controller is configured to generate downlink sounding messages for transmission by the transmitter in designated downlink sounding frames among a plurality of downlink sounding frames allocated for feeder stations operating in a wireless backhaul network; generate spatial signature information for a selecting base station that has selected the feeder station for service in the backhaul network based on uplink sounding messages received from the selecting base station in assigned uplink sounding frames; generate interference spatial signature information based on signals received during uplink sounding frames other than the assigned uplink sounding frames for the selecting base station; and based on the spatial signature information for the selecting base station and the interference spatial signature information, generate interference nulling beamforming weights for use by the feeder station when transmitting downlink backhaul traffic signals to the selecting base station and/or receiving signals from uplink backhaul traffic signals from the selecting base station.

Moreover, a processor readable medium is provided that is encoded with or stores instructions, that when executed by a processor, cause the processor to: generate downlink sounding messages in designated downlink sounding frames among a plurality of downlink sounding frames allocated for downlink sounding to base stations; generate spatial signature information with respect to a selecting base station for service in the backhaul network based on uplink sounding messages received from the selecting base station in assigned uplink sounding frames; generate interference spatial signature information based on signals received during uplink sounding frames other than the assigned uplink sounding frames for the selecting base station; and based on the spatial signature information for the selecting base station and the interference spatial signature information, generate interference nulling beamforming weights for use when transmitting downlink backhaul traffic signals to the selecting base station and/or receiving signals from uplink backhaul traffic signals from the selecting base station.

The efficiency of interference suppression largely depends on how accurately the BSs and feeder stations can observe the spatial signatures of the interference and desired signals. A protocol is provided herein that allows the BSs and feeder stations to accurately make these observations.

Figure 5:
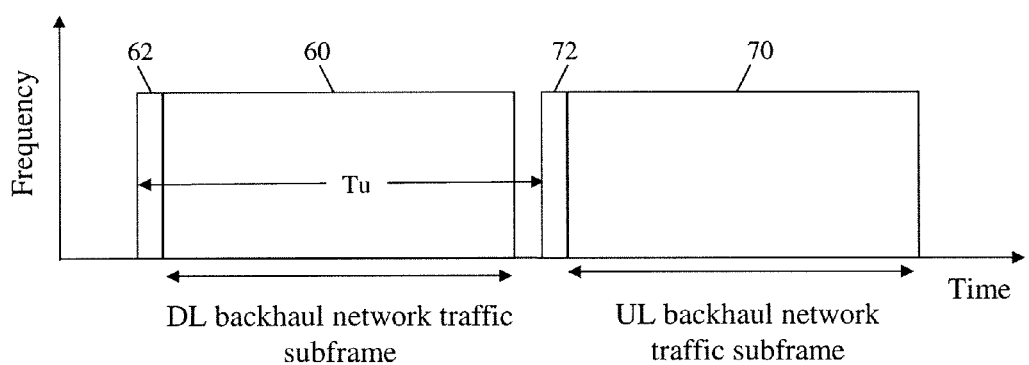
FIG. 5 is a signal timing diagram illustrating downlink sounding zones and uplink sounding zones with respect to a downlink sub-frame and an uplink subframe.

Reference is now made to FIG. 5. To allow for accurate observations of the spatial signatures of interferences and desired signals, special sounding zones are allocated in connection with a UL backhaul network traffic subframe 60 and a DL backhaul network traffic subframe 70. For example, as shown in FIG. 5, a DL sounding zone 62 is appended to the beginning of the UL backhaul network traffic subframe and an UL sounding zone 72 is appended to the beginning of the UL backhaul network traffic subframe. Also as an example, each sounding zone 62 and 72 is one symbol. There is a time delay period Tu that indicates the time interval from the end of the DL sounding zone 62 to the beginning of the UL sounding zone 72.

For example, if the wireless link for the backhaul network uses the communication protocol of the partial usage of subchannels (PUSC) mode of a 5 MHz WiMAX system, there are total 420 tones per symbol for DL sounding and 408 tones per symbol for UL sounding. Thus, there are total 420 and 408 constellation points in the DL sounding zone 62 and UL sounding zone 72, respectively. When binary phase shift keying (BPSK) and ½ error coding rate are used, the DL and UL sounding zones 62 and 72 can carry 210 and 204 bits, respectively.

The DL and UL sounding zones 62 and 72 are also referred to hereinafter as DL and uplink sounding frames. During a DL sounding frame, a feeder station sends a DL sounding message. During an UL sounding frame, a BS sends an UL sounding message. Each DL sounding frame is a time interval during which a designated feeder station transmits a DL sounding message. A scheme is described herein for allocating different occurrences of the DL and UL sounding zones, i.e., DL and UL sounding frames, such that no two feeder stations transmit DL sounding messages during the same DL sounding frame, and such that no two BS's transmit UL sounding messages during the same UL sounding frame. In this way, a feeder station can generate a spatial signature associated with desired signals (UL sounding message) during an assigned UL sounding frame from a BS that has selected it for service in the backhaul network and also generate interference spatial signatures for all other UL sounding signals occurring during other UL sounding frames. Likewise, the BS can generate a spatial signature associated with desired signals (DL sounding message) during a designated DL sounding frame from a feeder station that it has selected for backhaul network service and also generate interference spatial signatures from DL sounding signals occurring during other DL sounding frames.

Figure 6:
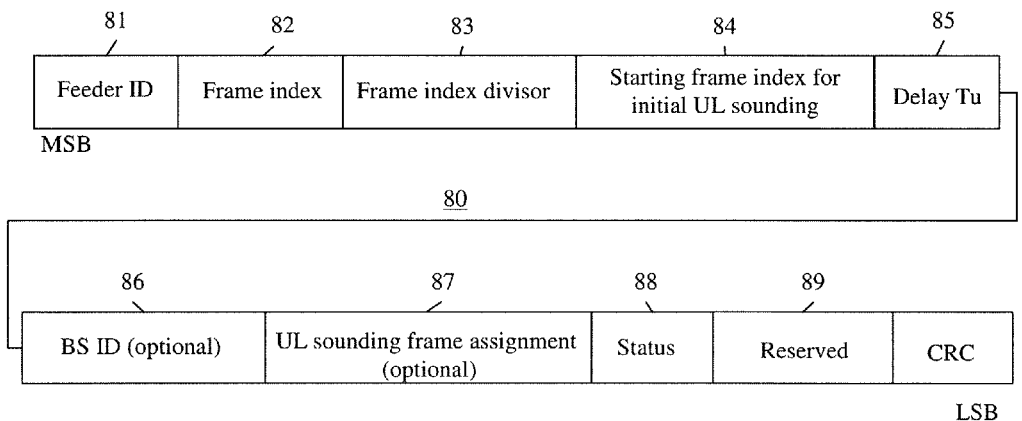
FIG. 6 is a diagram depicting fields of a downlink sounding message configured for collaborative spatial signature observation.

Turning now to FIG. 6, an example of a format for a DL sounding message is now described. The downlink DL sounding message is generally identified by reference numeral 80. There are several fields enumerated 81-89, and an cyclic redundancy code (CRC) field, in the DL sounding message 80. Each field is allocated an appropriate number of bits.

The Feeder Identifier (ID) field 81 is allocated for a feeder ID bit sequence to identify each feeder station. Each feeder station is assigned a unique feeder ID bit sequence. When a feeder station transmits a DL sounding message, it includes its unique feeder ID bit sequence in field 81.

The Frame index field 82 is allocated for a frame index that identifies each DL sounding frame. That is, each DL sounding frame is assigned a frame index. The frame index is used to assign DL sounding frames to feeder stations.

The Frame index divisor field 83 is allocated for a divisor value used to determine the frames for DL and UL sounding. The frame index divisor is a value that defines a total number of frames to be transmitted in a cycle comprised of a plurality of downlink sounding frames and a plurality of uplink sounding frames. The operations of the frame index divisor and the frame index are described further hereinafter in connection with FIGS. 8 and 9.

The Starting frame index field 84 is allocated to specify a starting frame index to be used by a BS for initial UL sounding. This is the minimum frame index to be used for all initial UL sounding made by BSs that have yet to be assigned to an UL sounding frame.

The DL-UL delay field 85 is allocated to specify a value for the time delay interval Tu between the end of a DL sounding frame and the beginning of an UL sounding frame. The time delay interval Tu is shown in FIG. 5.

The BS ID field 86 is allocated to provide an ID of a BS for an assigned UL sounding frame specified in field 87. Thus, the BS ID field 86 may be empty in certain instances when a feeder station has not been an UL sounding frame assignment to a BS.

The UL sounding frame assignment field 87 is allocated to specify a UL sounding frame that is assigned to the BS having the ID specified in the BS ID field 86 of the same DL sounding frame. The UL sounding frame is assigned by a frame index value corresponding to that UL sounding frame. Again, when the feeder station is not making a UL sounding frame assignment to a BS, the field 87 may be empty.

The Status field 88 is allocated to indicate a state associated with the feeder station that is transmitting the DL sounding frame. Examples of the states that are indicated by the Status field 88 are listed in the table below.

| Status bits | Description |
| --- | --- |
| 00 | Feeder station has not completed capturing the UL spatial signature for the BS identified in the BS ID field. BS is to continue sounding at the assigned UL sounding frames. BS is not to start normal backhaul network traffic. |
| 01 | Feeder station is able to capture the UL spatial signature for the BS identified in the BS ID field. BS is to continue sounding at the assigned UL sounding frames to enable feeder station to update beamforming/nulling weights. BS can start normal backhaul network traffic. |
| 10 | Request to hand over the BS identified in the BS ID field to another feeder station. |
| 11 | Exit of the BS identified in the BS ID field is granted. |

There is a reserved field 89 that is allocated for possible future functions. The reserved field 89 may be used for a variety of function. For example, the feeder station may include its Global Positioning System (GPS) location information in field 89 for location services, or include bits in field 89 to indicate its capacity/load conditions for the purpose of load balancing.

There is also a cyclic redundancy check (CRC) field for CRC checking of the bits of the DL sounding message.

Each feeder station is assigned a unique DL sounding frame during which no other feeder stations transmit DL sounding messages. The DL sounding frame assignment (frame index and frame index divisor) to feeder stations is made by the management server 50 shown in FIG. 2, for example.

The frame index divisor operates as follows. Feeder station 1 is assigned to transmit DL sounding message at frame N mod(frame index divisor). Feeder station 1 sends its DL sounding message at DL frames having a frame index equal to N in the following expression: N=modulo(frame index, frame index divisor). For example, feeder station 15 is assigned to frame 10 and a frame index divisor of 1000. Feeder station 15 transmits its DL sounding message at frames 10, 1010, 2010, and so on. This will guarantee that BSs can clearly listen to each feeder station's DL sounding message at a specific time without any interference from other feeder stations' DL sounding messages. The frame index divisor determines the number of DL sounding frames and likewise the number of UL sounding frames in cycle before the cycle repeats.

Figure 7:
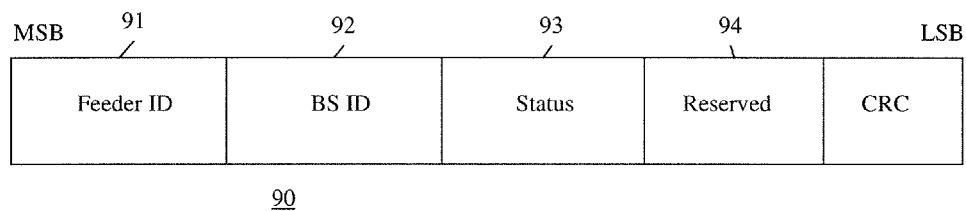
FIG. 7 is a diagram depicting fields of an uplink sounding message configured for collaborative spatial signature observation.

Turning to FIG. 7, an example of an UL sounding message is now described. The UL sounding message is generally identified by reference numeral 90. The UL sounding message comprises a Feeder ID field 91, a BS ID field 92, a Status field 93, a Reserved field 94 and a CRC field.

The Feeder ID field 91 is allocated to indicate the ID of a serving feeder selected by a BS (the BS identified in the BS ID field 92).

The BS ID field 92 is allocated to indicate the ID of the BS that is transmitting the UL sounding message, and which is selecting the feeder station identified in the Feeder ID field 91.

The Status field 93 is allocated to indicate a state associated with the BS that is transmitted the UL sounding frame. Examples of the states that are indicated by the Status field 93 are listed in the table below.

| Status | Description |
| --- | --- |
| 00 | This UL sounding frame is being sent by the BS identified in the BS ID field as an initial UL sounding message. |
| 01 | This UL sounding frame is one that has been assigned to the BS identified in the BS ID field according to information provided by the feeder station identified in the Feeder ID field in a DL sounding message from that feeder station. |
| 10 | Exit. BS is requesting to exit the backhaul network from the feeder station identified in the Feeder ID field. |

Figure 8:
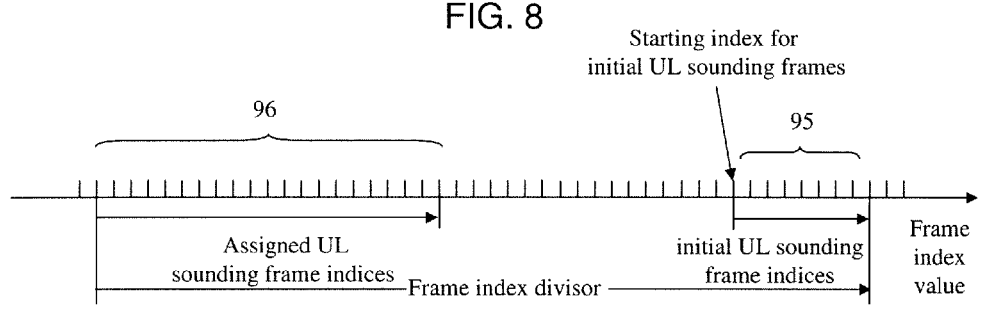
FIG. 8 is a diagram depicting a frame indexing assignment scheme for uplink sounding messages.

Turning now to FIG. 8, a diagram is shown that depicts allocation and assignment of a frame index for UL sounding frames to BSs. FIG. 8 illustrates a number line along which frame index values are plotted. As explained above, the frame index divisor specifies the number of frames of UL sounding messages and the number of frames of DL sounding messages in a cycle before the cycle repeats. A first predetermined number of frames are allocated, based on field 84 in the DL sounding message, for initial UL sounding frames that a BS may use when UL sounding to a particular feeder station. This is shown at reference numeral 95 in FIG. 8. There are additional UL sounding frame indices that are used to allocate UL sounding frames for specific assignment by a feeder station to a BS. This is shown at reference numeral 96 in FIG. 8. Thus, UL sounding frame allocation scheme depicted in FIG. 8 allows for allocation of a subset of the plurality of UL sounding frames for initial uplink sounding by BSs and a remaining subset of the plurality of UL sounding frames for UL sounding frame assignment to BSs that have selected a feeder station for service.

Figure 9:
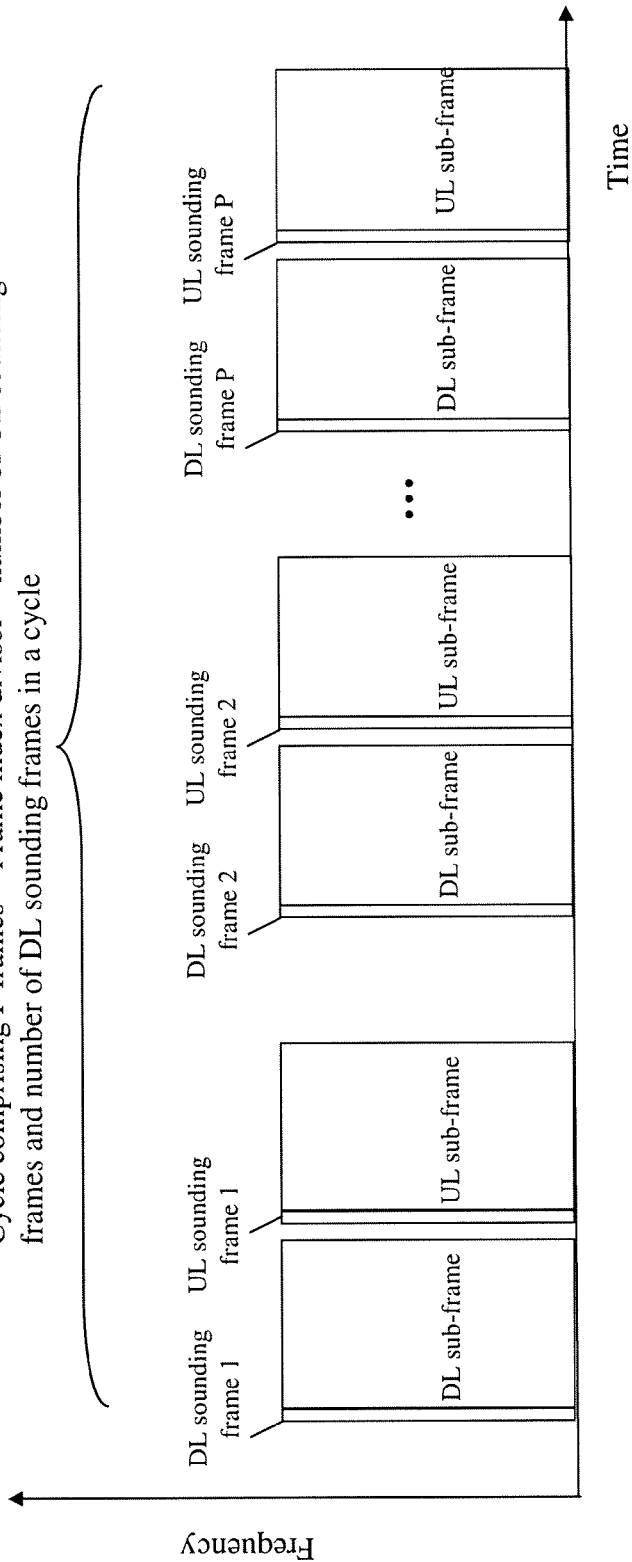
FIG. 9 is a diagram depicting a cycle of downlink sounding frames and uplink sounding frames.

FIG. 9 illustrates the make up of a cycle of DL sounding frames and UL sounding frames. Each occurrence of a DL sounding zone 62 (FIG. 5) comprises a single DL sounding frame and likewise each occurrence of an UL sounding zone 72 (FIG. 5) comprises a single UL sounding frame. In other words, the DL sounding zone is long enough to carry a single DL sounding frame (e.g. a single DL sounding message from a given feeder station), and likewise a single UL sounding frame is only long enough to carry a single UL sounding frame comprising a single message from a given base station. The frame index divisor specifies the total number of UL and DL frames in a "cycle" and the cycle repeats so that a UL or DL frame assignment repeats at the same position in each successive cycle. When a BS is assigned to an UL sounding frame, this means that it is to transmit an UL sounding message at that UL frame position (specified by a frame index) in each cycle. Likewise, when a feeder station is given a designated DL sounding frame, this means that the feeder station transmits a DL sounding message at that DL frame position (specified by a frame index) in each cycle. Thus, FIG. 9 depicts an indexing scheme for the DL sounding frames and the UL sounding frames to cycle through a plurality of DL sounding frame occurrences and UL sounding frame occurrences in such a way that a designated DL sounding frame repeats from cycle to cycle and an assigned UL sounding frame also repeats from cycle to cycle. Over multiple cycles, there are multiple occurrences of each designated DL sounding frame and of each assigned UL sounding frame.

Figure 10:
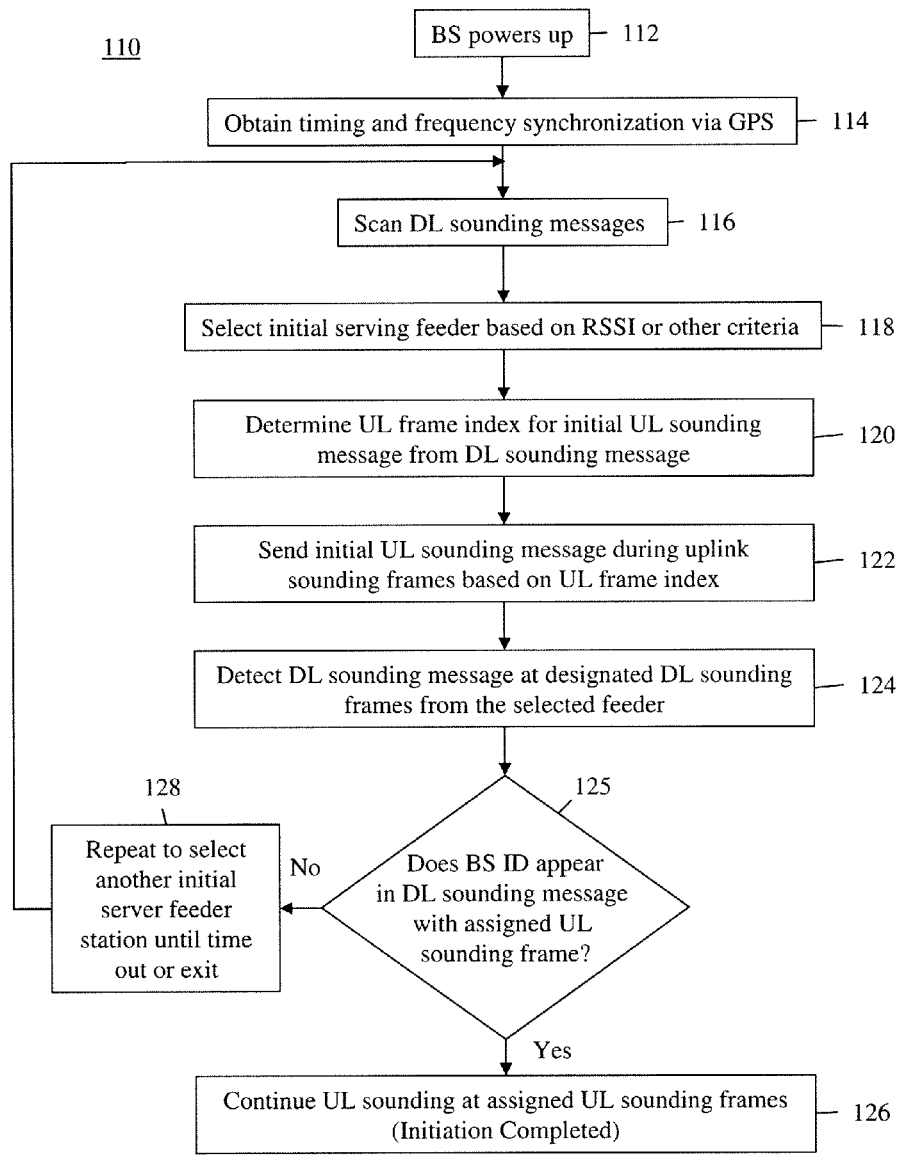
FIG. 10 is a flow chart for an initialization function of the base station collaborative observation and nulling weight computation process.

Turning now to FIG. 10, a first sub-process 110 of the BS collaborative observation and nulling weight computation process logic 100 is now described. A BS executes sub-process 110 during an initialization phase to become added to the wireless backhaul network at a feeder station. At 112, the BS powers up and becomes ready to connect to the wireless backhaul network. At 114, the BS obtains timing and frequency synchronization parameters for its primary wireless network. For example, if the primary wireless network is configured to operate in accordance with the WiMAX™ standard, then the BS obtains timing and frequency synchronization parameters in part from global positioning system (GPS) signals it receives.

At 116, the BS scans the DL sounding messages that are being transmitted over a period of time during DL sounding zones with respect to DL backhaul network subframes, as depicted in FIGS. 5 and 9. At 118, the BS selects an initial serving feeder station from received DL sounding messages. In general, the BS selects one of the plurality of feeder stations (that are transmitted DL sounding messages) for service in the wireless backhaul network by evaluating downlink sounding messages received for two or more of the plurality of feeder stations. For example, the BS may select a feeder station based on the received signal strength information (RSSI) for a plurality of received DL sounding messages, such that the received DL sounding message with the best RSSI is selected. Since the DL sounding message includes a feeder station ID, the BS directly determines from the received DL sounding message the feeder station that transmitted the DL sounding message and thus the feeder station that it selects as its initial serving feeder station. In other forms, the BS may select the serving feeder station based on other configurations, such as based on an order of priority or preference for several feeder stations.

At 120, the BS determines the frame index for the initial UL sounding message to use for UL sounding to the initial serving feeder station. The BS makes this determination based on the starting frame index for initial UL sounding, denoted Ni, which is contained in field 84 of the DL sounding message and based on the frame index divisor contained in the field 83 of the DL sounding message. The BS may randomly select a frame index for initial UL sounding that is between Ni and the frame index divisor.

Next, at 122, the BS sends an initial UL sounding message at frames in cycles of UL sounding frames according to the frame index derived at 120 for initial uplink sounding, based on the formula modulo(frame index, frame index divisor). In other words, the uplink sounding message sent at 122 is sent during an uplink sounding frame derived from the starting frame index for uplink sounding frames to be used for initial uplink sounding to the serving feeder station, wherein the uplink sounding message contains a base station identifier for the base station and the feeder station identifier for the feeder station that is selected to be the serving feeder station. As explained hereinafter in connection with FIG. 11, feeder stations scan all UL sounding frames (assigned and initial) in order to detect initial UL sounding frames from BSs.

At 124, the BS listens during the DL sounding zones for a DL sounding message at the designated DL sounding frames for the feeder station that it initially selected as its serving feeder station. At 125, the BS determines whether its BS ID appears in field 86 of a received DL sounding message from the feeder station that it initially selected to be its serving feeder station. The BS examines the feeder ID field 82 to verify that the DL message has been sent by the feeder station that it selected at 118 to be its initial serving feeder station. The BS also examines the received DL sounding message to determine whether there is an UL sounding frame assignment made in field 87 of the DL sounding message that contains its BS ID.

When the BS detects a DL sounding frame that contains its BS ID and an UL sounding frame assignment, then at 126, the BS will continue UL sounding at UL sounding frames according to the UL sounding frame assignment. The reception of a DL sounding message from the feeder station that is selected to be the serving feeder station indicates acceptance of the feeder station selected by the BS to be its serving feeder station. At this point, the initial phase of the BS's connection to the backhaul network is complete. On the other hand, when the BS does not detect a DL sounding frame that contains its BS ID, then at 128, the process from 116-125 is repeated to select an other feeder station to be a serving feeder station and to receive a DL sounding message from that other feeder station that includes its BS ID indicating that the other feeder station has accepted its selection. This loop of 116-125 repeats until a time-out occurs or until the BS makes a controlled exit (as explained hereinafter). A feeder station that the BS selects as its initial serving feeder station may be overloaded at the time and thus configured to not admit a new BS to serve in the backhaul network.

Whenever a BS sends an UL sounding message, it includes UL sounding message type information by way of the Status field 93 to indicate whether the UL sounding message is for initial UL sounding (at 122) or for ongoing UL sounding based on UL sounding frame assignment (at 126).

Figure 11:
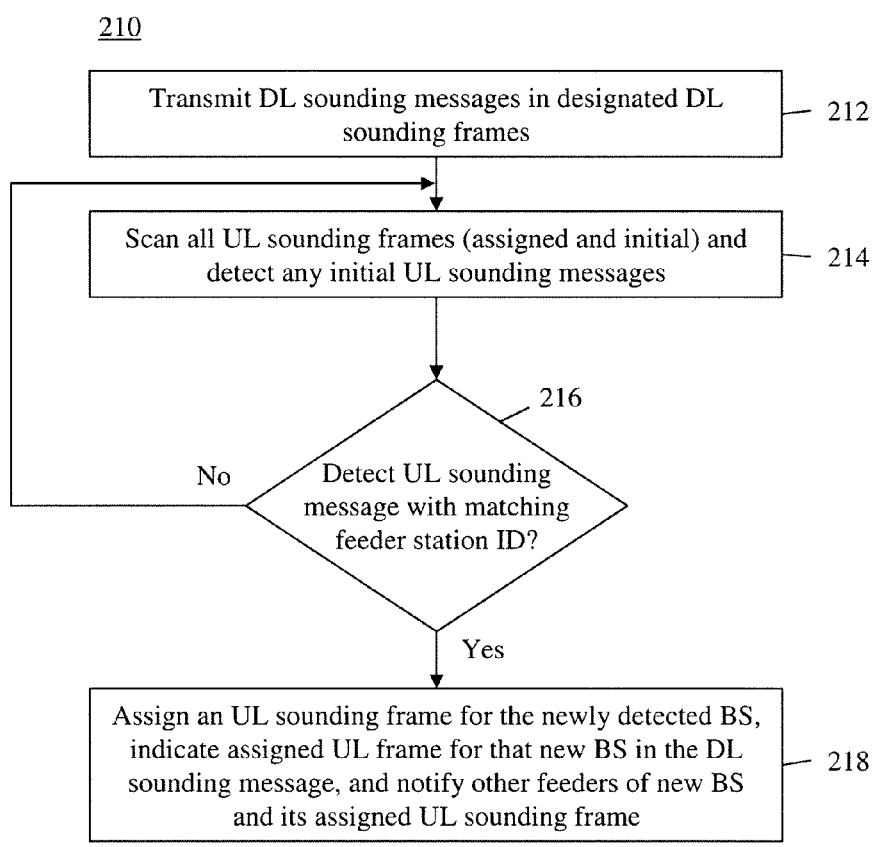
FIG. 11 is a flow chart for an initialization process of the feeder collaborative observation and nulling weight computation process.

Reference is now made to FIG. 11 for a description of a first sub-process 210 of the feeder station collaborative observation and nulling weight computation process logic 200. The sub-process 210 is employed by a feeder station to acknowledge a selection as an initial serving feeder station by a BS and to confirm the selection for ongoing communications with that BS in the backhaul network. At 212, the feeder station transmits DL sounding messages in its designated DL sounding frames. As explained above, the DL sounding frames in which a feeder station transmits DL sounding messages may be determined by a central device, such as a management server 50 shown in FIG. 2. Moreover, as explained above, the feeder station transmits DL sounding messages in designated DL sounding frames among a plurality of DL sounding frames such that no two feeder stations transmit a downlink DL message in the same DL sounding frame. As explained above in connection with FIG. 6, each DL sounding message comprises a feeder station identifier that identifies the feeder station that transmits the DL sounding message, a frame index that identifies an index for the DL sounding frame in which the DL sounding message is transmitted, a frame index divisor that represents a total number of frames to be transmitted in a cycle comprised of a plurality of DL sounding frames and a plurality of UL sounding frames, and a starting frame index indicating a starting frame index for UL sounding frames to be used for sending UL sounding messages for initial UL sounding to the feeder station identified by the feeder station identifier.

At 214, the feeder station scans all UL sounding frames (assigned and initial) to detect any initial UL sounding messages from a BS. That is, the feeder station receives UL sounding messages in corresponding UL sounding frames allocated for BSs to transmit UL sounding messages such that no two BSs are assigned to transmit an UL sounding message in the same UL sounding frame.

At 216, the feeder station examines UL sounding messages to determine whether its feeder ID is contained in any of the messages. When this occurs, the feeder station will tag itself as the serving feeder for the BS that transmitted the UL sounding message that contains its feeder ID. The feeder station may deny a selection by a BS when it does not have available capacity for the BS at the time of the selection. Thus, at 216, the feeder station determines whether a received UL sounding message contains a feeder station identifier for the feeder station indicating that a BS has selected the feeder station for service in the backhaul network. Again, the UL sounding message comprises a base station identifier that identifies the base station that has transmitted the uplink sounding message. A BS that selects a feeder station for service is referred to herein as a selecting BS with respect to that feeder station. The evaluation at 216 continues repeatedly as indicated by the loop back to 214 when a match is not found.

At 218, when a feeder station accepts its selection as an initial serving feeder station for a BS based on a received UL sounding message, the feeder station assigns an UL sounding frame to the BS (for more permanent UL sounding) and indicates this UL sounding frame assignment in a DL sounding message that it transmits. In addition, the feeder station sends a message, via a wired network or wirelessly, to the other feeder stations in the backhaul network, where the message informs the other feeder station that a new BS has been added to the backhaul network and that it has been allocated the assigned UL sounding frame. The other feeder stations are configured not to assign to other BSs the same newly assigned UL sounding frame. In this way, a given UL sounding frame will not be assigned to two different BS. Thus, at 218, when the feeder station accepts its selection by the selecting BS, it generates an UL sounding frame assignment to the selecting BS such that the assigned UL sounding frames for the selecting base station are not used by other BSs. In DL sounding messages that are transmitted by the feeder station during its designated DL sounding frames, the feeder station includes an acceptance indication to the selecting BS that the feeder station accepts that it has been selected by the selecting BS and includes in transmitted DL sounding messages information indicating the UL sounding frame assignment for the selecting BS to use when transmitting UL sounding messages to the feeder station. The acceptance indication included in the transmitted DL sounding messages is the presence of the BS ID for the selecting BS, and as depicted in FIG. 6, the DL sounding message also includes the feeder station ID for the feeder station that transmitted the DL sounding message.

Furthermore, as indicated above in connection with FIG. 6, the feeder station also includes in DL sounding messages information indicating whether or not the feeder station has captured an UL spatial signature for the selecting BS so as to inform the selecting BS whether to start sending UL backhaul network traffic.

Thus, the sub-process 210 executed by the feeder station involves assigning to a BS a unique UL sounding frame. As a result, the BS will transmit its UL sounding message at the frame index that equals its assigned frame index modulo the frame index divisor. This collaborative UL sounding scheme allows feeder stations to listen to the UL sounding message of each BS that it serves without interference from other BSs or other feeder stations.

Figure 12:
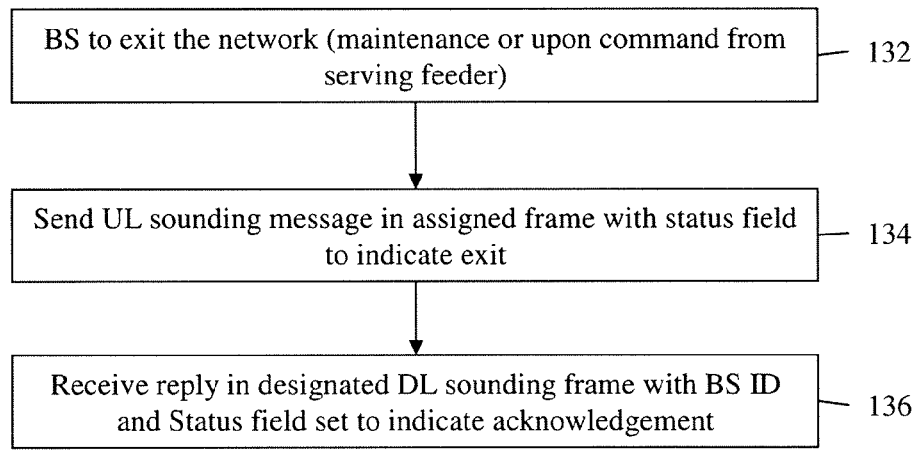
FIG. 12 is a flow chart for an exit process of the base station collaborative observation and nulling weight computation process.

Turning to FIG. 12, a second sub-process 130 of the BS collaborative observation and nulling weight computation process logic 100. The sub-process 130 is configured to allow a BS to exit the backhaul network. A BS can exit the backhaul network in a controlled way or uncontrolled way. In a controlled exit, as indicated at 132, the BS may exit for network maintenance or in response to a command from its serving feeder station. For example, a BS may receive a DL sounding message from its feeder station in which the Status field bits are set to "10" indicated that the serving feeder station is requesting the BS to connect to a different feeder station for service. The serving feeder station may have exhausted its capacity and is seeking to shed some of its load to another feeder station. At 134, the BS sends an UL sounding message in its assigned UL assigned frame with the Status field bits set to "10" indicating that the BS request to exit the backhaul network from that feeder station. At 136, the BS receives a DL message reply sent from its serving feeder station in its designated DL sounding frame, where the DL message contains the BS ID and the Status field bits are set to "11" indicating that the feeder station has granted the exit.

Figure 13:
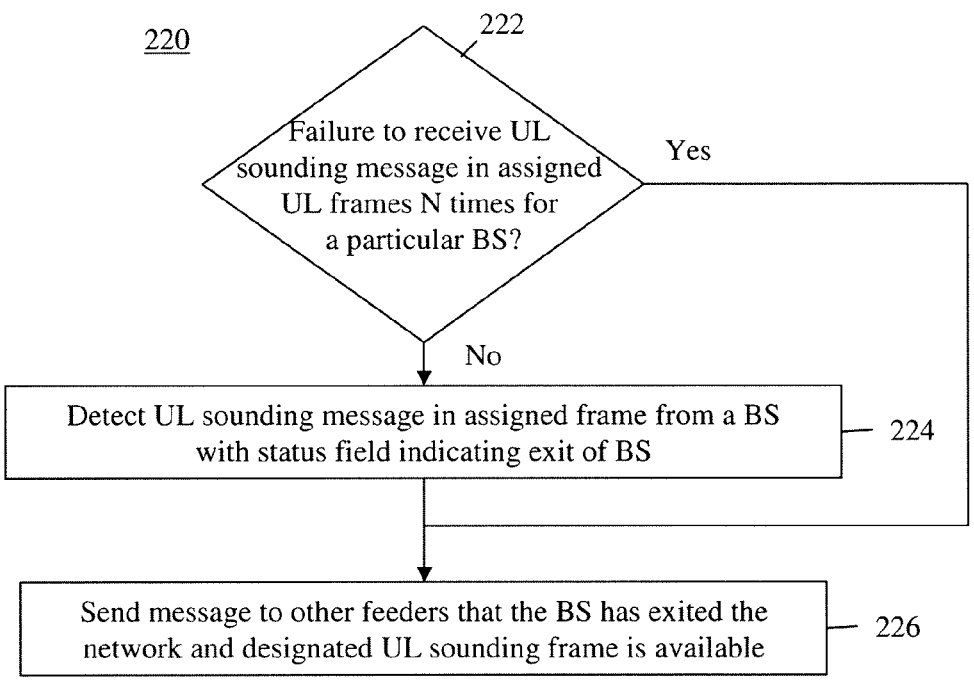
FIG. 13 is a flow chart for an exit process of the feeder collaborative observation and nulling weight computation process.
Figure 14:
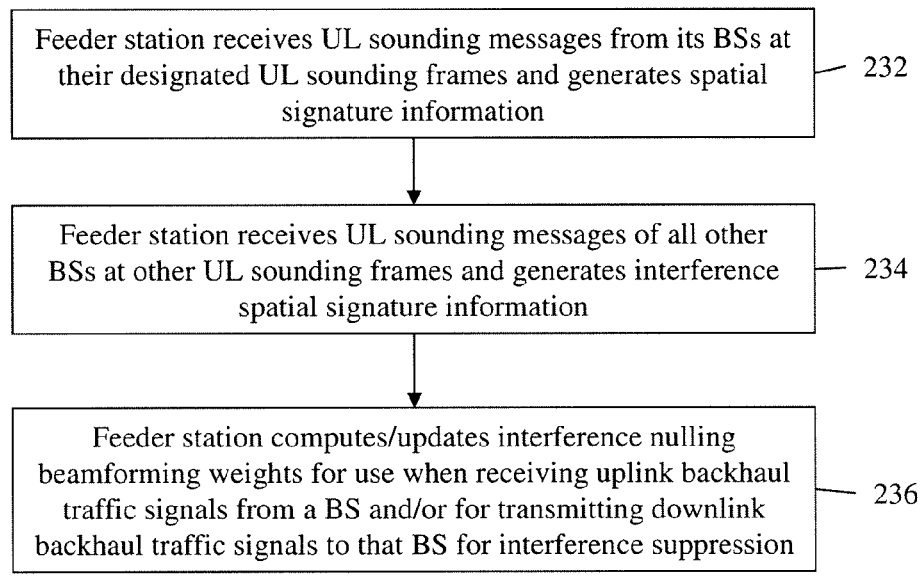
FIG. 14 is a flow chart for a spatial signature observation and nulling weight computation process performed at a feeder station.

FIG. 13 illustrates a flow chart for a sub-process 220 that a feeder station employs to perform an uncontrolled exit from the backhaul network for a BS. An uncontrolled exit may occur when there is a power outage or some other event that take the BS off the network unexpectedly. At 222, the feeder station determines whether it fails to receive UL sounding messages at the assigned frames a Z consecutive times for a given BS. When this occurs, then at 226, the feeder station considers that BS to have exited the network and informs all the other feeder stations about the exiting BS. On the other hand, at 224, the feeder station determines when it receives a UL sounding message in an assigned UL sounding frame from a BS with the Status field bits set to "10" indicating that it is requesting to exit the network. When this occurs, the process continues to 226. When a BS leaves the network, the UL sounding frame assigned to that BS becomes unassigned and available for re-assignment to a new or another BS in the future. Thus, the sub-process 220 allows for a feeder station to terminate service to a BS that it has been serving when the feeder station fails to receive UL sounding messages from the selecting BS a predetermined number of consecutive instances of its assigned UL sounding frame or in response to receiving from the BS an UL sounding message containing information indicating the BS requests to terminate backhaul network service with the feeder station Referring now to FIG. 14, a sub-process 230 of the feeder station collaborative observation and nulling weight computation process logic 200 is now described. The sub-process 230 is the mechanism by which the feeder station generates spatial signature information it needs for computing interference nulling beamforming weights. At 232, the feeder station receives UL sounding messages of its assigned BSs at their designated UL sounding frames and generates spatial signature information for each BS. That is, for a given BS that has selected the feeder station for service in the backhaul network (referred to herein as a selecting BS), the feeder station generates spatial signature information for the selecting BS based on UL sounding messages received from the selecting BS in assigned uplink sounding frames. At 234, the feeder station receives UL sounding messages during UL sounding frames other than the assigned UL sounding frame (for each BS it is serving) and generates interference spatial signature information based on those signals. Said another way, for a given selecting BS, the feeder station generates interference spatial signature information based on signals received during UL sounding frames other than the assigned UL sounding frames for the selecting BS.

At 236, the feeder station computes updated feeder interference nulling beamforming weights based on the spatial signature information (for desired signals) computed at 232 and the interference spatial signature information computed at 234. The feeder station uses appropriate interference nulling beamforming weights for interference suppression with respect to signals received from a BS that it is serving. In other words, at 236, based on the spatial signature information for a selecting BS (a BS that the feeder station serves) and the interference spatial signature information, the feeder station computes updated interference nulling beamforming weights for use by the feeder station when transmitting DL backhaul traffic signals to the selecting BS and/or receiving signals from UL backhaul traffic signals from the selecting BS the feeder station.

Thus, based on the foregoing, from the feeder station perspective, a method is provided for a feeder station that is part of a wireless backhaul network comprising a plurality of feeder stations each configured to communicate backhaul traffic to and from one or more base stations that serve wireless client devices in a wireless network. The feeder station transmits downlink sounding messages in designated downlink sounding frames among a plurality of downlink sounding frames. The feeder station is allocated a designated downlink sounding frame (to be used across cycles of downlink sounding frames) such that no two feeder stations transmit a downlink sounding message in the same downlink sounding frame. The feeder station receives uplink sounding messages in corresponding uplink sounding frames allocated for base stations to transmit uplink sounding messages. Again, uplink sounding messages are received from base stations such that no two base stations are assigned to transmit an uplink sounding message in the same uplink sounding frame. The feeder station generates spatial signature information with respect to a selecting base station that has selected the feeder station for service in the backhaul network based on uplink sounding messages received from the selecting base station in assigned uplink sounding frames. The feeder station generates interference spatial signature information based on signals received during uplink sounding frames other than the assigned uplink sounding frames for the selecting base station. Based on the spatial signature information for the selecting base station and the interference spatial signature information, the feeder station generates interference nulling beamforming weights for use by the feeder station when transmitting downlink backhaul traffic signals to the selecting base station and/or receiving signals from uplink backhaul traffic signals from the selecting base station.

Figure 15:
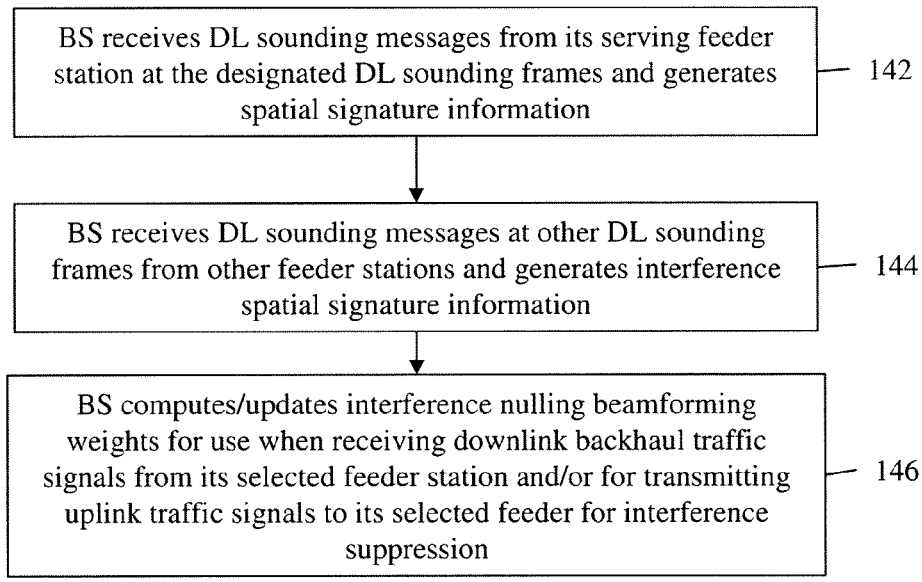
FIG. 15 is a flow chart for a spatial signature observation and nulling weight computation process performed at the base station.

FIG. 15 illustrates a sub-process 140 of BS collaborative observation and nulling weight computation process logic 100 whereby the BS generates spatial signature information it needs for computing interference nulling beamforming weights. At 142, the BS receives DL sounding messages from its serving feeder station at the designated DL sounding frames for its serving feeder station, and generates spatial signature information (of desired signals). At 144, the BS receives DL sounding messages of one or more other feeder stations other than its serving feeder station at their designated DL sounding frames and generates interference spatial signature information. At 146, based on the spatial signature information for the serving feeder station computed at 142 and the interference spatial signature information computed at 144, the BS generates updated nulling beamforming weights for use by the BS when transmitting UL backhaul traffic signals to its serving feeder station and/or for use when receiving DL backhaul traffic signals from its serving feeder station.

Thus, based on the foregoing, from the base station perspective, a method is provided in which a base station configured to serve wireless client devices in a wireless network receives downlink sounding messages in corresponding downlink sounding frames transmitted by respective ones of a plurality of feeder stations operating in a wireless backhaul network. The base station transmits uplink sounding messages in a particular one of a plurality of uplink sounding frames allocated for uplink sounding from base stations to feeder stations. The base station transmits its uplink sounding messages in assigned uplink sounding frames that are assigned by feeder stations such that no two base stations transmit an uplink sounding message in the same uplink sounding frame. The base station generates spatial signature information with respect to a serving feeder station based on downlink sounding messages received from the serving feeder station in downlink sounding frames designated for the serving feeder station. The base station generates interference spatial signature information based on signals received during downlink sounding frames other than the downlink sounding frames designated for the serving feeder station. Based on the spatial signature information for the serving feeder station and the interference spatial signature information, the base station generates interference nulling beamforming weights for use by the base station when transmitting uplink backhaul traffic signals to the serving feeder station and/or for use when receiving downlink backhaul traffic signals from the serving feeder station.

UL sounding messages received by feeder stations and DL sounding messages received by BSs are used to derive spatial signature information for the purposes described herein. These messages need not contain any special pattern because they are sent during time periods such that they do not overlap with other UL or DL transmissions. As a result, the mere reception of these messages (at the multiple antennas of the receiving device) allows the receiving device to compute a spatial signature.

Since the backhaul wireless network is a fixed point-to-multipoint (P-MP) network, the interference nulling beamforming weights computed (both at the feeder station and the BS) may be used for both transmit beamforming and receive beamforming. There are many ways to compute the interference nulling beamforming weights. One way is to use an eigenvector scheme described below, and again, this scheme is employed at both the feeder stations and BSs.

This involves computing a covariance matrix $R_I$ for all interference and a covariance matrix $R_S$ for the desired signal. A computation expression for the eigenvector scheme is: $(R_I + \sigma_n^2 \cdot I)^{-1} \cdot R_S \cdot W = \lambda \cdot W$, where $R_I$ and $R_S$ are defined as above, $\sigma_n$ is a noise variance, I is the unit matrix. The dominant eigenvector of the above expression will give the optimal interference nulling beamforming weight vector W, where the dimension of W is equal to the number of antennas at the device (feeder station or BS) where the computation is being made. The covariance matrices $R_I$ and $R_S$ may be computed as $$R_I = \sum_i y_i y_i^H;$$

$R_S = y_s y_s^H$, where $y_i$ is the received signal vector for interfering signals, $y_s$ is the received signal vector for desired signals and $^H$ is the Hermitian operation.

With respect to a BS, interfering signals are DL sounding messages received from any feeder station other than its serving feeder station and desired signals are DL sounding messages received from its serving feeder station. From the feeder station perspective, interfering signals, with respect to a particular BS that it is serving, are UL sounding messages received from any BS other than that particular BS, and desired signals are UL sounding messages received from that particular BS.

Since the backhaul network is a fixed P-MP network, the nulling beamforming weights can updated at a relatively slow rate. For example, when the frame index divisor is set to 2000, this allows 1999 BSs in a single network deployment. The update interval for such a configuration is 2000*5 ms=10 s, which is more than enough in a fixed P-MP network.

The UL and DL sounding schemes described herein are a prerequisite for normal UL and DL backhaul network traffic. Both the feeder station and the BS needs to have the appropriate interference nulling beamforming weights computed before sending and receiving normal backhaul network traffic in order to suppress interference. However, the UL and DL sounding schemes are totally transparent to the normal backhaul network traffic. In this regard, the sounding schemes described herein can be appended to any backhaul protocol, subject to allocation of a time period allocated to an UL sounding zone and a DL sounding zone, as depicted in FIG. 5, for example. To minimize the overhead associated with the UL and DL sounding zones, the sounding zones can be activated on a periodic basis, e.g., once every 1 or 2 hours, so that the nulling weights are updated once every 1 or 2 hours. This is sufficient for fixed P-MP network where changes in the over-the-air channel is primary due to weather and temperature changes.

The DL and UL sounding schemes described herein reduce complexity and cost of the wireless backhaul network. This contributes towards reducing the overall cost of a (broadband) wireless network deployment, particularly when the BSs can design to be very inexpensive and simple to install at any location with little or no constraints. By providing for a scheme to ensure a reliable wireless connection between a BS and the feeder network, the broadband wireless network deployment is reduced to a proper feeder network deployment and the BSs can be added in any nearly any location at will.

By implement an interference suppression scheme at both the BSs and feeder stations, the performance of the wireless backhaul network is improved from a carrier-to-interference-plus-noise ratio (CINR) of 0 dB to a CINR as no less than 25 dB, for example. To meet desirable throughput requirements, a relatively high CINR is needed to support higher order modulation and coding schemes. For example, a CINR of 25 dB generally is needed for quadrature amplitude modulation (QAM) 64 with an error coding rate of 5/6.

The DL and UL sounding techniques do not rely on any particular technique to compute a spatial signature. Instead, the sounding techniques are based on the fact that only device is transmitting a sounding signal at any given time so that a spatial signature resulting from the transmission, as received by another device, can be computed very accurately. Moreover, it is known to transmit a special sounding signal pattern when multiple devices may be transmitting at the same time for a sounding function. The use of a special sounding signal pattern in for UL and DL sounding in a backhaul network is not practical because one device may detect hundreds of transmitters (from BSs and feeder stations) at the same time since all of these devices are transmitting above ground and thus not subject to attenuation from ground landscape features. Consequently, the DL and UL sounding schemes described herein ensure that only one device is sending a sounding message at any time allocated for UL or DL sounding.

Furthermore, from a system perspective, a system is provided comprising a plurality of base stations configured to operate in a wireless network and to serve wireless client devices in the wireless network, and a plurality of feeder stations configured to operate in a wireless backhaul network and to serve base stations in the wireless backhaul network. Each base station is configured to transmit uplink sounding messages in a particular one of a plurality of uplink sounding frames allocated for uplink sounding to feeder stations such that no two base stations transmit an uplink sounding message in the same uplink sounding frame. Each feeder station is configured to transmit downlink sounding messages in designated downlink sounding frames among a plurality of downlink sounding frames such that no two feeder stations transmit a downlink sounding message in the same downlink sounding frame.

Furthermore, each base station is configured to receive downlink sounding messages in corresponding downlink sounding frames transmitted by respective ones of a plurality of feeder stations, generate spatial signature information for a serving feeder station for the base station based on downlink sounding messages received from the serving feeder station in downlink sounding frames designated for the serving feeder station, generate interference spatial signature information based on signals received during downlink sounding frames other than the downlink sounding frames designated for the serving feeder station, and based on the spatial signature information for the serving feeder station and the interference spatial signature information, generate interference nulling beamforming weights for use by the base station when transmitting uplink backhaul traffic signals to the serving feeder station and/or for use when receiving downlink backhaul traffic signals from the serving feeder station.

Similarly, each feeder station is configured to receive uplink sounding messages in corresponding uplink sounding frames, to generate spatial signature information for a selecting base station that has selected the feeder station for service in the backhaul network based on uplink sounding messages received from the selecting base station in assigned uplink sounding frames, generate interference spatial signature information based on signals received during uplink sounding frames other than the assigned uplink sounding frames for the selecting base station, and based on the spatial signature information for the selecting base station and the interference spatial signature information, generate interference nulling beamforming weights for use by the feeder station when transmitting downlink backhaul traffic signals to the selecting base station and/or receiving signals from uplink backhaul traffic signals from the selecting base station.

The above description is intended by way of example only. Various modifications and structural changes may be made therein without departing from the scope of the concepts described herein and within the scope and range of equivalents of the claims.

What is claimed is:

1. A method comprising:
at a base station operating in a wireless network configured to serve wireless client devices, receiving at a plurality of antennas of the base station downlink sounding messages in corresponding downlink sounding frames, wherein each downlink sounding frame is appended to a separate downlink network traffic subframe that is transmitted by respective ones of a plurality of feeder stations operating in a wireless backhaul network, and wherein the downlink sounding frames are each allocated to a single feeder station in accordance with a time division scheme in which no two feeder stations transmit a downlink sounding message in the same downlink sounding frame;
transmitting from the base station uplink sounding messages in a particular one of a plurality of uplink sounding frames, wherein each uplink sounding frame is appended to a separate uplink network traffic subframe, and wherein the uplink sounding frames are each allocated to a single base station in accordance with the time division scheme for uplink sounding to feeder stations;
generating spatial signature information with respect to a serving feeder station for the base station based on downlink sounding messages received from the serving feeder station in downlink sounding frames designated for the serving feeder station;
generating interference spatial signature information based on signals received during downlink sounding frames other than the downlink sounding frames designated for the serving feeder station; and
based on the spatial signature information for the serving feeder station and the interference spatial signature information, generating interference nulling beamforming weights for use by the base station when transmitting uplink backhaul traffic signals to the serving feeder station and/or for use when receiving downlink backhaul traffic signals from the serving feeder station.

2. The method of claim 1, and further comprising selecting one of the plurality of feeder stations to be the serving feeder station for service in the wireless backhaul network by evaluating downlink sounding messages received for two or more of the plurality of feeder stations.

3. The method of claim 2, and further comprising obtaining from received downlink sounding messages a feeder station identifier that identifies the feeder station that transmitted the downlink sounding message, a frame index that identifies an index for the downlink sounding frame in which the downlink sounding message is transmitted, a frame index divisor that represents a total number of frames to be transmitted in a cycle comprised of a plurality of downlink sounding frames and a plurality of uplink sounding frames, and a starting frame index indicating a starting frame index for uplink sounding frames to be used for sending uplink sounding messages for initial uplink sounding to the feeder station identified by the feeder station identifier.

4. The method of claim 3, wherein upon selecting one of the plurality of feeder stations to be the serving feeder station, further comprising transmitting an uplink sounding message during an uplink sounding frame derived from the starting frame index for uplink sounding frames to be used for initial uplink sounding to the serving feeder station, wherein the uplink sounding message contains a base station identifier for the base station and the feeder station identifier for the feeder station that is selected to be the serving feeder station.

5. The method of claim 4, and further comprising determining whether any of the downlink sounding messages received from the feeder station that is selected to be the serving feeder station contains a base station identifier that matches the base station identifier for the base station which indicates acceptance of the selected feeder station as the serving feeder station, and if so, obtaining an uplink sounding frame assignment contained in the downlink sounding message that also contains the base station identifier for the base station.

6. The method of claim 5, and further comprising transmitting uplink sounding messages at an uplink sounding frame in each cycle according to the uplink sounding frame assignment and based on the frame index divisor.

7. The method of claim 5, wherein upon failing to receive a downlink sounding message containing a base station identifier for the base station that indicates acceptance of the selected feeder station, selecting comprises selecting an other of the plurality of feeder stations to be the serving feeder station and repeating the obtaining, transmitting of an uplink sounding message to the other of the plurality of feeder stations, and receiving of downlink sounding messages from the other of the plurality of feeder stations to determine whether the other of the plurality of feeder stations has indicated acceptance of its selection to be the serving feeder station.

8. The method of claim 5, and further comprising including uplink sounding message type information in uplink sounding messages to be transmitted, wherein the uplink message type information indicates whether the uplink sounding message is for initial uplink sounding or is for ongoing uplink sounding based on the uplink sounding frame assignment.

9. The method of claim 1, wherein receiving downlink sounding messages comprises receiving downlink sounding messages during a time interval prior to a time interval during which downlink backhaul network traffic is transmitted in the backhaul network, and transmitting comprises transmitting uplink sounding messages during a time interval prior to a time interval during which uplink backhaul network traffic is transmitted in the backhaul network.

10. A method comprising:
at a feeder station that is part of a wireless backhaul network comprising a plurality of feeder stations each configured to communicate backhaul traffic to and from one or more base stations that serve wireless client devices in a wireless network, transmitting downlink sounding messages in designated downlink sounding frames among a plurality of downlink sounding frames, wherein each downlink sounding frame is appended to a separate downlink network traffic subframe is allocated to a single feeder station in accordance with a time division scheme in which no two feeder stations transmit a downlink sounding message in the same downlink sounding frame;
receiving uplink sounding messages in corresponding uplink sounding frames allocated for base stations to transmit uplink sounding messages, wherein each uplink sounding frame is appended to a separate uplink network traffic subframe, and wherein the uplink sounding frames are each allocated to a single base station in accordance with the time division scheme such that no two base stations transmit an uplink sounding message in the same uplink sounding frame;

generating spatial signature information with respect to a selecting base station that has selected the feeder station for service in the backhaul network based on uplink sounding messages received from the selecting base station in assigned uplink sounding frames;

generating interference spatial signature information based on signals received during uplink sounding frames other than the assigned uplink sounding frames for the selecting base station; and based on the spatial signature information for the selecting base station and the interference spatial signature information, generating interference nulling beamforming weights for use by the feeder station when transmitting downlink backhaul traffic signals to the selecting base station and/or receiving signals from uplink backhaul traffic signals from the selecting base station.

11. The method of claim 10, wherein transmitting downlink sounding messages comprises transmitting information comprising a feeder station identifier that identifies the feeder station that transmits the downlink sounding message, a frame index that identifies an index for the downlink sounding frame in which the downlink sounding message is transmitted, a frame index divisor that represents a total number of frames to be transmitted in a cycle comprised of a plurality of downlink sounding frames and a plurality of uplink sounding frames, and a starting frame index indicating a starting frame index for uplink sounding frames to be used for sending uplink sounding messages for initial uplink sounding to the feeder station identified by the feeder station identifier.

12. The method of claim 11, and further comprising determining whether a received uplink sounding message contains a feeder station identifier for the feeder station indicating that the selecting base station has selected the feeder station for service in the backhaul network, which the uplink sounding message comprising a base station identifier that identifies the base station that has transmitted the uplink sounding message, and when the feeder station accepts its selection by the selecting base station, generating an uplink sounding frame assignment to the selecting base station such that the assigned uplink sounding frames for the selecting base station are not used by other base stations, and in downlink sounding messages that are transmitted by the feeder station during the designated downlink sounding frames, including an acceptance indication to the selecting base station that the feeder station accepts that it has been selected by the selecting base station and including in transmitted downlink sounding messages information indicating the uplink sounding frame assignment for the selecting base station to use when transmitting uplink sounding messages to the feeder station.

13. The method of claim 12, and further comprising sending a message to other feeder stations to advise them of the uplink sounding frame assignment made to the selecting base station so that other feeder stations do not make the same uplink sounding frame assignment to another base station.

14. The method of claim 11, and further comprising including in downlink sounding messages a feeder identifier for the feeder station, a base station identifier that corresponds to the base station identifier of the selecting base station and which presence of the base station identifier serves as the acceptance indication to the selecting base station.

15. The method of claim 14, wherein transmitting downlink sounding messages comprises transmitting information in each downlink sounding message indicating whether or not the feeder station has captured an uplink spatial signature for the selecting base station so as to inform the selecting base station whether to start sending uplink backhaul network traffic.

16. The method of claim 14, and further comprising terminating service to a base station that the feeder station had been serving when the feeder station fails to receive uplink sounding messages from the base station a predetermined number of consecutive instances of its assigned uplink sounding frame or in response to receiving from the base station an uplink sounding message containing information indicating the base station requests to terminate backhaul network service with the feeder station.

17. The method of claim 10, wherein transmitting downlink sounding messages comprises receiving downlink sounding messages during a time interval prior to a time interval during which downlink backhaul network traffic is transmitted in the backhaul network, and wherein receiving uplink sounding messages comprises receiving uplink sounding messages during a time interval prior to a time interval during which uplink backhaul network traffic is transmitted in the backhaul network.

18. A system comprising:
a plurality of base stations configured to operate in a wireless network and to serve wireless client devices in the wireless network;
a plurality of feeder stations configured to operate in a wireless backhaul network and to serve base stations in the wireless backhaul network;
wherein each base station is configured to transmit uplink sounding messages in a particular one of a plurality of uplink sounding frames, wherein each uplink sounding frame is appended to a separate uplink network traffic subframe, and wherein the uplink sounding frames are each allocated to a single base station for uplink sounding to feeder stations in accordance with a time division scheme such that no two base stations transmit an uplink sounding message in the same uplink sounding frame;
wherein each feeder station is configured to transmit downlink sounding messages in designated downlink sounding frames among a plurality of downlink sounding frames, wherein each downlink sounding frame is appended to a separate downlink network traffic subframe, and wherein each downlink sounding frame is allocated to a single feeder station in accordance with the time division scheme such that no two feeder stations transmit a downlink sounding message in the same downlink sounding frame;
wherein each base station is configured to receive downlink sounding messages in corresponding downlink sounding frames transmitted by respective ones of a plurality of feeder stations, generate spatial signature information for a serving feeder station for the base station based on downlink sounding messages received from the serving feeder station in downlink sounding frames designated for the serving feeder station, generate interference spatial signature information based on signals received during downlink sounding frames other than the downlink sounding frames designated for the serving feeder station, and based on the spatial signature information for the serving feeder station and the interference spatial signature information, generate interference nulling beamforming weights for use by the base station when transmitting uplink backhaul traffic signals to the serving feeder station and/or for use when receiving downlink backhaul traffic signals from the serving feeder station;

wherein each feeder station is configured to receive uplink sounding messages in corresponding uplink sounding frames, to generate spatial signature information for a selecting base station that has selected the feeder station for service in the backhaul network based on uplink sounding messages received from the selecting base station in assigned uplink sounding frames, generate interference spatial signature information based on signals received during uplink sounding frames other than the assigned uplink sounding frames for the selecting base station, and based on the spatial signature information for the selecting base station and the interference spatial signature information, generate interference nulling beamforming weights for use by the feeder station when transmitting downlink backhaul traffic signals to the selecting base station and/or receiving signals from uplink backhaul traffic signals from the selecting base station.

19. A base station apparatus comprising:
a plurality of antennas;
a receiver configured to generate a plurality of receive signals based on reception at respective ones of the plurality of antenna of downlink sounding messages in corresponding downlink sounding frames transmitted by respective ones of a plurality of feeder stations operating in a wireless backhaul network, wherein each downlink sounding frame is appended to a separate downlink network traffic subframe, and wherein the downlink sounding frames are each allocated to a single feeder station in accordance with a time division scheme in which no two feeder stations transmit a downlink sounding message in the same downlink sounding frame;
a transmitter configured to generate transmit signals to be transmitted by respective ones of the plurality of antennas; and
a controller configured to connect to the transmitter and the receiver, wherein the controller is configured to:
generate uplink sounding messages for transmission by the transmitter in a particular one of a plurality of uplink sounding frames allocated for uplink sounding;
generate spatial signature information with respect to a serving feeder station based on downlink sounding messages received from the serving feeder station in downlink sounding frames designated for the serving feeder station;
generate interference spatial signature information based on signals received during downlink sounding frames other than the downlink sounding frames designated for the serving feeder station; and
based on the spatial signature information for the serving feeder station and the interference spatial signature information, generate interference nulling beamforming weights for use when transmitting uplink backhaul traffic signals to the serving feeder station and/or for use when receiving downlink backhaul traffic signals from the serving feeder station.

20. The base station of claim 19, where from a received downlink sounding message, the controller is configured to determine a feeder station identifier that identifies a feeder station that transmitted the downlink sounding message, a frame index that identifies an index for the downlink sounding frame in which the downlink sounding message is transmitted, a frame index divisor that represents a total number of frames to be transmitted in a cycle comprised of a plurality of downlink sounding frames and a plurality of uplink sounding frames, and a starting frame index indicating a starting frame index for uplink sounding frames to be used for sending uplink sounding messages for initial uplink sounding to the feeder station identified by the feeder station identifier.

21. The base station of claim 20, wherein upon selecting one of a plurality of feeder stations to be a serving feeder station, the controller is configured to cause the transmitter to transmit an uplink sounding message during an uplink sounding frame derived from the starting frame index for uplink sounding frames to be used for initial uplink sounding to the serving feeder station, wherein the uplink sounding message contains a base station identifier for the base station and the feeder station identifier for the feeder station that is selected to be the serving feeder station.

22. A feeder station apparatus comprising:
a plurality of antennas;
a receiver configured to generate a plurality of receive signals based on reception at respective ones of the plurality of antennas of uplink sounding messages in corresponding uplink sounding frames allocated for base stations to transmit uplink sounding messages, wherein each uplink sounding frame is appended to a separate uplink network traffic subframe, and wherein the uplink sounding frames are each allocated to a single base station in accordance with a time division scheme in which no two base stations transmit an uplink sounding message in the same uplink sounding frame;
a transmitter configured to generate transmit signals to be transmitted by respective ones of the plurality of antennas, including downlink sounding messages;
a controller configured to connect to the receiver and the transmitter, wherein the controller is configured to:
generate downlink sounding messages for transmission by the transmitter in designated downlink sounding frames among a plurality of downlink sounding frames allocated for feeder stations operating in a wireless backhaul network
generate spatial signature information for a selecting base station that has selected the feeder station for service in the backhaul network based on uplink sounding messages received from the selecting base station in assigned uplink sounding frames;
generate interference spatial signature information based on signals received during uplink sounding frames other than the assigned uplink sounding frames for the selecting base station; and
based on the spatial signature information for the selecting base station and the interference spatial signature information, generate interference nulling beamforming weights for use by the feeder station when transmitting downlink backhaul traffic signals to the selecting base station and/or receiving signals from uplink backhaul traffic signals from the selecting base station.

23. The feeder station of claim 22, wherein the controller is configured to generate downlink sounding messages that comprise a feeder station identifier that identifies the feeder station that transmits the downlink sounding message, a frame index that identifies an index for the downlink sounding frame in which the downlink sounding message is transmitted, a frame index divisor that represents a total number of frames to be transmitted in a cycle comprised of a plurality of downlink sounding frames and a plurality of uplink sounding frames, and a starting frame index indicating a starting frame index for uplink sounding frames to be used for sending uplink sounding messages for initial uplink sounding to the feeder station identified by the feeder station identifier.

24. The feeder station of claim 23, wherein the controller is configured to determine whether a received uplink sounding message contains a feeder station identifier for the feeder station indicating that the selecting base station has selected the feeder station for service in the backhaul network, which the uplink sounding message comprising a base station identifier that identifies the base station that has transmitted the uplink sounding message, and when the feeder station accepts its selection by the selecting base station, generating an uplink sounding frame assignment to the selecting base station such that the assigned uplink sounding frames for the selecting base station are not used by other base stations, and in downlink sounding messages that are transmitted by the feeder station during the designated downlink sounding frames, including an acceptance indication to the selecting base station that the feeder station accepts that it has been selected by the selecting base station and including in transmitted downlink sounding messages information indicating the uplink sounding frame assignment for the selecting base station to use when transmitting uplink sounding messages to the feeder station.

* * * * *